United States Patent
Vankipuram et al.

(10) Patent No.: US 10,726,378 B2
(45) Date of Patent: Jul. 28, 2020

(54) INTERACTION ANALYSIS

(71) Applicant: HEWLETT-PACKARD DEVELOPMENT COMPANY, L.P., Houston, TX (US)

(72) Inventors: Mithra Vankipuram, Palo Alto, CA (US); Robert G Walmsley, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 292 days.

(21) Appl. No.: 15/539,873

(22) PCT Filed: Feb. 24, 2015

(86) PCT No.: PCT/US2015/017342
§ 371 (c)(1),
(2) Date: Jun. 26, 2017

(87) PCT Pub. No.: WO2016/137447
PCT Pub. Date: Sep. 1, 2016

(65) Prior Publication Data
US 2017/0372255 A1    Dec. 28, 2017

(51) Int. Cl.
*G06Q 10/08*    (2012.01)
*G06F 3/03*    (2006.01)
*G06Q 10/06*    (2012.01)

(52) U.S. Cl.
CPC .............. *G06Q 10/08* (2013.01); *G06F 3/03* (2013.01); *G06Q 10/063* (2013.01); *G06Q 10/087* (2013.01)

(58) Field of Classification Search
None
See application file for complete search history.

(56) References Cited

U.S. PATENT DOCUMENTS 6,937,151 B1 *    8/2005   Tapanes   ............... G08B 13/124
                                                 250/227.19
6,970,095 B1    11/2005   Lee et al.
(Continued)

FOREIGN PATENT DOCUMENTS

WO    WO-2014107184 A2    7/2014

OTHER PUBLICATIONS

Jeffrey D. Poston,2014 "Towards Indoor Localization of Pedestrians via Smart Building Vibration", https://ieeexplore.ieee.org/stamp/stamp.jsp?arnumber=7217137&tag=1 (Year: 2014).*
(Continued)

*Primary Examiner* — Allen C Chein
(74) *Attorney, Agent, or Firm* — HPI Patent Department (57) ABSTRACT

An example system is provided in according with one implementation of the present disclosure. The system includes a first sensor positioned at a storage structure displaying an item, where the first sensor is to capture vibration data in proximity to the item. The system further includes a location analysis engine to perform a location analysis of a user, an identity analysis engine to perform an identity analysis of the user, a user interaction engine to perform an interaction analysis of the user's interaction with the item based on the vibration data from the first sensor, and a collaboration engine to perform a collaboration analysis related to the item based on the location analysis of the user, the identity analysis of the user, and the user interaction analysis with the item.

13 Claims, 3 Drawing Sheets

(56) References Cited

U.S. PATENT DOCUMENTS

| | | | |
|---|---|---|---|
| 7,780,081 B1* | 8/2010 | Liang | G06Q 30/0633 |
| | | | 235/383 |
| 8,138,926 B2 | 3/2012 | Bomba et al. | |
| 8,710,983 B2 | 4/2014 | Malkowski | |
| 9,161,172 B2* | 10/2015 | Poduri | H04W 64/006 |
| 2005/0273201 A1 | 12/2005 | Zukowski et al. | |
| 2012/0004769 A1 | 1/2012 | Hallenbeck et al. | |
| 2013/0302763 A1 | 11/2013 | Edwards et al. | |
| 2014/0114708 A1* | 4/2014 | Campbell | G08B 5/22 |
| | | | 705/7.11 |
| 2014/0175162 A1 | 6/2014 | Argue et al. | |
| 2014/0363059 A1 | 12/2014 | Hurewitz | |
| 2016/0124976 A1* | 5/2016 | Bai | G08G 1/0112 |
| | | | 707/748 |

OTHER PUBLICATIONS

Pan, "Indoor Person Identification through Footstep Induced Structural Vibration" (Year: 2015).*

Accelerometers from STMicroelectronics Track Activity of Objects and People before Reporting to Mother: Feb. 18, 2014; http://www.st.com/web/en/press/en/t3510.

"Symposium on interaction with Smart Artifacts"; Mar. 7-9, 2011; http://old.hcilab.org/events/jpde/program/talks.

Reality Matters, printed on Nov. 3, 2014, from, http://blog.estimote.com/post/95382199590/nearables-are-here-introducing-estimote-stickers, 12 pages.

Thomas von der Grün; "Locating- and Communication Technologies for Smart Objects"; printed from http://www.iis.fraunhofer.de/content/dam/iis/en/documente/veranstaltungen/2014/istanbul_s2/LOC_COM_SMART_vdGruen_IIS, Sep. 25, 2014, 23 pages.

* cited by examiner

INTERACTION ANALYSIS

BACKGROUND

Tracking user physical interactions with different items or products has always been a desirable goal for many organizations. The collected information may be used for different purposes and may be of a high value to these organizations.

DETAILED DESCRIPTION OF SPECIFIC EXAMPLES

As noted above, with the recent improvements in technology, the desire for detecting tangible user interactions with physical items or objects (e.g., medical supplies, consumer goods, etc.) is becoming increasingly popular in ail industries. The information collected from monitoring the physical interactions with different items may be used for inventory management, understanding of customer behavior, theft prevention, etc. As used herein, the term "item" may refer to any type of physical object that a user may interact with. Examples of items may include medication or medical supplies in a storage cabinet of a hospital, a consumer product on a shelf at a store, etc. As used herein, the term "user" may refer to a person (e.g., a consumer in a store, a nurse in a hospital, etc.) that may be in a direct physical interaction with an item.

Generally, data about tangible user interaction with physical items may be useful hi many different ways. Such information may be stored and used by the organization collecting it, or may sold to third party vendors for tailored advertising based on the user's interests. Currently, much of the data collected about users in physical spaces is transactional data when users check in/out of an environment. In a retail environments, data is recorded when customers purchase items. Online vendors are able to easily track products that customers are interested in by monitoring the web pages they visit and the links they click on. In buildings, data is recorded when a person enters the building (e.g., through digital identification checks). On toll highways, detailed information about a passing vehicle may be recorded without the driver having to physically "check in/out".

However, there is not an appropriate alternative for such data tracking of tangible user interactions for brick-and-mortar (i.e., physical) stores and other types of venues where inventory management is important (e.g., hospitals, medical offices, etc.). Therefore, some organizations (e.g., stores, etc.) have difficulties understanding what users do during their visit, and other organizations (e.g., medical offices, etc.) have limited or insufficient means for tracking inventory.

Due to the encumbrances described above, physical stores only have access to data about items the customer has already purchased. In addition, other venues that keep track of various items must perform manual inventory of many stored items, which is costly and time consuming. Even with manually inventory, it may be very difficult to determine the exact person that interacted with an item and the specific item that he or she interacted with. Therefore, improved systems and techniques for detecting tangible user interactions with physical items are desired.

The present description is directed to an improved solution for comprehensive detecting and tracking tangible user interactions with physical items. Implementations of the disclosed technology provide a system that performs a collaboration analysis related to an item displayed on a storage structure (e.g., shelf, storage cabinet, etc.). In one example, the system uses sensors attached to structures in physical spaces (e.g., to storage structures) to detect tangible or touch-based interactions with artifacts located on these structures. The users interaction with the item is determined based on the vibration data from the sensors. The system also performs a location analysis of a user to detect a location of the user in relation to the storage structure, and an identity analysis of the user to detect his or her identity. Then, a collaboration analysis related to the item is performed based on the location analysis of the user, the identity analysis of the user, and the user interaction analysis with the item. The collaboration analysis may identify a specific item on the storage structure that a user is interacting with and the specific user performing the interaction.

As used herein, the term "vibration data" refers to a set of data values that collectively represent the frequency and amplitude of the movements and vibrations generated by an item placed on a storage structure and captured by a highly sensitive sensor (e.g., an accelerometer). The vibration data represents the different movements of an item when a user touches, moves, lifts the item, etc. Due of the high sensitivity of the sensor, the vibration data captured by sensor is typically easy to detect and transmits. By employing a highly sensitive, multi-axis accelerometer, extremely detailed vibratory signatures may be collected which can be analyzed to finely differentiate items and their locations.

Thus, the proposed technology allows for efficient and accurate tracking of tangible user interactions with items in physical stores and other types of venues that perform inventory management of various items.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Figure 1:
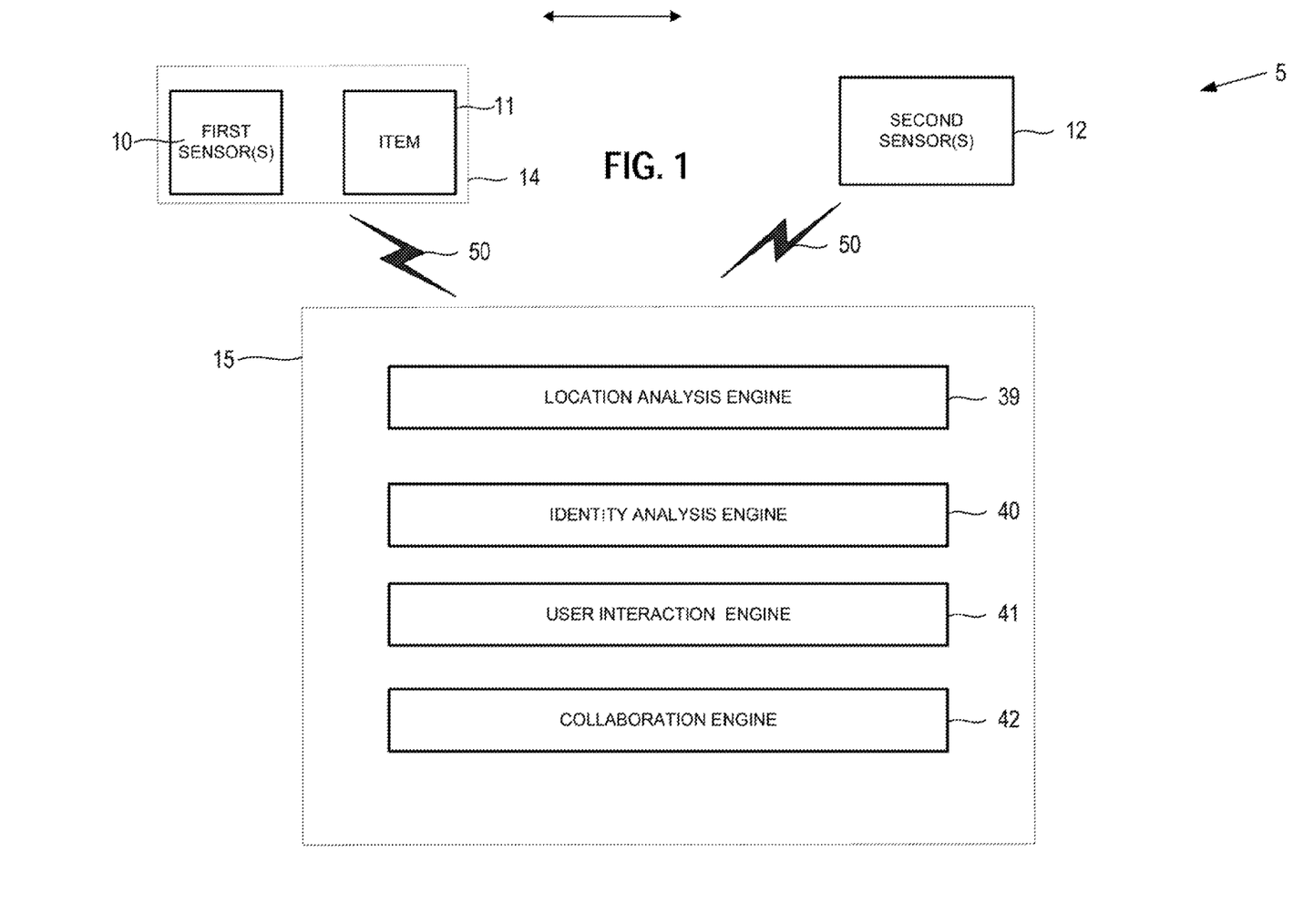
FIG. 1 is a schematic illustration of an example system for detecting and tracking tangible user interactions with physical items in accordance with an implementation of the present disclosure.

Referring now to the figures, FIG. 1 is a schematic illustration of an example system 5 for detecting and tracking tangible user interactions with physical items. The illustrated system 5 is capable of carrying out the techniques described below. As shown in FIG. 1, the system 5 is depicted as including at least one first sensor 10 (e.g., an accelerometer), at least one second sensor 12 (e.g., an accelerometer, a proximity sensor, etc.), and a computing device 15. In one example, the first sensor 10 may be positioned at a storage structure 14 (e.g., a store shelf, a medicine cabinet, etc.) displaying an item 11 or a plurality of items. The second sensor 12 may be positioned near the storage structure 14 (e.g., on a pathway between several storage structures) to determine user's proximity to the storage structure by using vibration data from the second of sensor. Although only computing device 15 is described in details below, the techniques described herein may be performed with several computing devices.

In one example, the described system 5 may be used in a physical store (e.g., a retail store), where the storage structure 14 may be a merchandize shelf that includes at least one sensor 10 and displays different merchandize items. As described in additional detail below, the storage structure 14 may include a plurality of sensors 10 (e.g., at each level of the shelf, etc.). In another example, the described system 5 may be used in a venue where various valuable items are stored in different storage systems (e.g., medical office, etc.). In that example, the storage structure 14 may be a medical storage cabinet storing medications, supplies, etc. that includes at least one sensor 10.

The computing device 15 may be any type of a computing device and may include at least engines 39-42. In other examples, the computing device 15 may include additional components (e.g., processor, machine-readable storage medium, etc.) and some of the components depicted therein may be removed and/or modified without departing from a scope of the system that allows for carrying out the functionality described herein. It is to be understood that the operations described as being performed by the engines 39-42 of the computing device 15 that are related to this description may, in some implementations, be performed by external engines (not shown) or distributed between the engines of the computing device 15 and other electronic/computing devices (not shown).

The computing device 15 may include communication interfaces (e.g., a Wi-Fi® interface, a Bluetooth® interface, a 3G interface, a 4G interface, a near field communication (NFC) interface, etc.) that are used to connect with other devices/systems and/or to a network (not shown). The network may include any suitable type or configuration of network to allow for communication between the computing device 15, the sensors 10/12, and any other devices/systems (e.g., other computing devices, displays, etc.).

In one example, sensors 10 and 12 may be accelerometers that include ultra-high sensitivity microfabricated accelerometer technology with three-phase sensing. Accelerometers 10 and 12 may be sensors that detect acceleration, i.e., a change in a rate of motion, with a high sensitivity and dynamic range. Because of the three-phase sensing technology, sensors 10 and 14 may sense acceleration levels as low as 10's of nano-gravities (ng) and may be manufactured and housed in any size device using Micro-Electro-Mechanical-Systems (MEMS) technology. The combination of high sensitivity and small device size enabled by three-phase sensing techniques allows sensors 10 and 12 to capture vibration data from an item 11 on the storage structure and a from a user near the storage structure. Sensors 10 and 12 may provide data to the system 5 by continuously transferring the data to the system or by storing the data in computer readable medium (not shown) for periodic transmittal or retrieval by the system 5.

Each of the engines 39-42 may include, for example, at least one hardware device including electronic circuitry for implementing the functionality described below, such as control logic and/or memory. In addition or as an alternative, the engines 39-42 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code, e.g., computer executable instructions, hardware, firmware, and/or logic, or combination thereof to perform particular actions, tasks, and functions described in more detail herein in reference to FIGS. 2-3.

In one example, the location analysis engine 39 may perform location analysis of a user by using location data from a location analysis source (not shown) to detect a location of the user in relation to the storage structure 14. For instance, the location analysis engine 39 may receive location data from the location analysis source(s) (e.g., second sensor 12, camera(s), various location tracking devices, radio-frequency identification (RIFD) badge, etc.) and may process the data to determine the location of the user (e.g., how close the user is to the storage structure 14).

Thus, the second sensor 12 may provide at least a portion of the location data to the location analysis engine 39 and the other portion of the location data may be received from other sources (e.g., camera(s), location tracking devices, passive or active RIFD badge, etc.). As explained in additional detail below, the second sensor(s) 12 may be an accelerometer(s) that can also serve as a proximity sensor. The second sensor(s) 12 may be positioned near the storage structure 14 (e.g., on a floor/pathway between different storage structures) to determine user's proximity to a storage structure by using vibration data from the second sensor 12. In one example, the level of vibration detected by the sensor 12 (e.g., when a user is walking near the sensor 12) may be proportional to the proximity to the storage structure 14. For instance, a first threshold related to the vibration data from the sensor(s) 12 may be set to detect if a user is in the general area of the store. A second threshold may be set to detect if a user is close to the storage structure 14. Thus, the second threshold may correspond to a different event (e.g., a storage structure proximity event) than the first threshold. For using the second sensor 12 as a proximity sensor, every storage structure 14 in the venue (e.g., a store) may have a second/floor sensor 12 associated with it.

The identity analysis engine 40 may perform an identity analysis of a user based on identity data from an identity source (not shown) to detect an identity of the user. For instance, the identity analysis engine 40 may receive identity data from various identity sources (e.g., camera, RIFD or Bluetooth low energy (BTLE) badge/tag system, etc.) and may process the identity information to determine the identity of the user in proximity to or at the storage structure 14. Thus, when a user is registered with a system (e.g., image of the user is stored in a database, user's badge or mobile device can be tracked), the identity analysis engine 40 may receive the corresponding identity data and a user may be identified by comparing the identity data to available information (i.e., image of the user, RIFD/BTLE badge/tag data, location tracking data, etc.).

The user interaction engine 41 may perform an interaction analysis of the user's interaction with an item 11 displayed on the storage structure 14. The interaction analysis may identify a user interaction even with the item 11. For example, the at least one first sensor 10 positioned at the storage structure 14 may capture vibration data in proximity to an item displayed on the structure 14. The vibration data may be generated when a user interacts with the item. The vibration data, the location data, and the identity data may be provided to engines 39-42 by connections 50. Connections 50 may include any suitable type and combination of wired and/or wireless connections that allow sensors, cameras, RIFD/BTLE badges, etc. to provide different data to engines 39-42. When the storage structure 14 includes a plurality of sensors 10, these sensors may form a data network that enables the system 5 to correlate and analyze vibration data from the different sensors 10 simultaneously. The interaction engine 41 may perform the interaction analysis with the vibration data to determine whether a user is interacting with an item on the storage structure 14. In one implementation, the user interaction engine 41 may receive vibration data as a continuous or periodic stream from sensor(s) 10 or may retrieve the data by accessing the data from a computer readable medium (not shown) of the sensor(s) 10. The interaction engine 41 may identify a user interaction with an item on the storage structure 14 by using the vibration data.

As explained in additional detail below, in one example, the user interaction engine 41 may detect an interaction event with an item 11 by using a combination of filter (not shown) and a set threshold to process the vibration data. As used herein, the term "interaction event" refers to any act of user interaction with an item. For instance, vibration data from the sensor(s) 10 may be extracted in temporal blocks of N seconds (e.g., 1, 5, 10 seconds, etc.) and passed through an event specific filter. For applications needing real-time response N may tend to zero. Then, the resulting signal from the vibration data may be assessed to determine if a threshold is breached. If so, an interaction event with the item is considered to have occurred. In other examples, different techniques for processing the data from sensor(s) and for detecting an interaction event may be used. The user interaction engine 41 may also detect and track tangible user interactions using vibration data from other accelerometers positioned in proximity to the item (e.g., at the storage structure 14), and sensor data from other sensors (e.g., sensor data from sensor(s) 12 positioned on the floor near the storage structure 14).

The collaboration engine 42 may perform a collaboration analysis related to an item 11 displayed on the storage structure 14 based on the location analysis of the user, the identity analysis of the user, and the user interaction analysis with the item. In one example, processing the vibration data from the first sensor 10, the location data, and the identity data is timely synchronized. In other words, the collaboration engine 42 may coordinate the processing all data related to the physical item (i.e., interaction) and the user (i.e., location, identity) to implement most accurate detection of tangible user interactions with an item.

For example, the collaboration analysis may determine a specific item 11 on the storage structure 14 that a user is interacting with and the user who is removing the item. That way, a collaborative analysis of the user's interaction with an item displayed on the storage structure may be performed by the system 5. In one implementation, the collaboration engine 42 may process item placement information to supplement the collaboration analysis. As described in additional details below, the item placement information may include specific data regarding the item and its position on the storage structure 14 (e.g., storage unit X displays boxes of rice, etc.). In one example, the item placement information may be received from position sensors placed on the items that provide information to the engine 42 from placement information about the location of the items that has been stored in a database (e.g., inventory database that specifies what items are placed on what shelves, etc.), etc.

Therefore, the system 5 may continuously receive venous data (e.g., vibration data, location data, identity data, item placement information data, etc.) from the different sources and processes the data to determine which user interacted with which specific item on the storage structure 14. For example, the system 5 may determine that a user has interacted (e.g., lifted, moved, etc.) with a specific item from the storage structure 14. If the system 5 determines some interaction with an item, the system 5 may generate a notification corresponding to the interaction activity. In particular, system 5 may store the interaction data in a memory (not shown) or may send the interaction data for further processing and analysis. That way, the system 5 may track the user interaction with the physical items stored on the storage structure 14. This collaborative analysis may be used for inventory management or to track users' interest in different items displayed on a storage structure.

Figure 2:
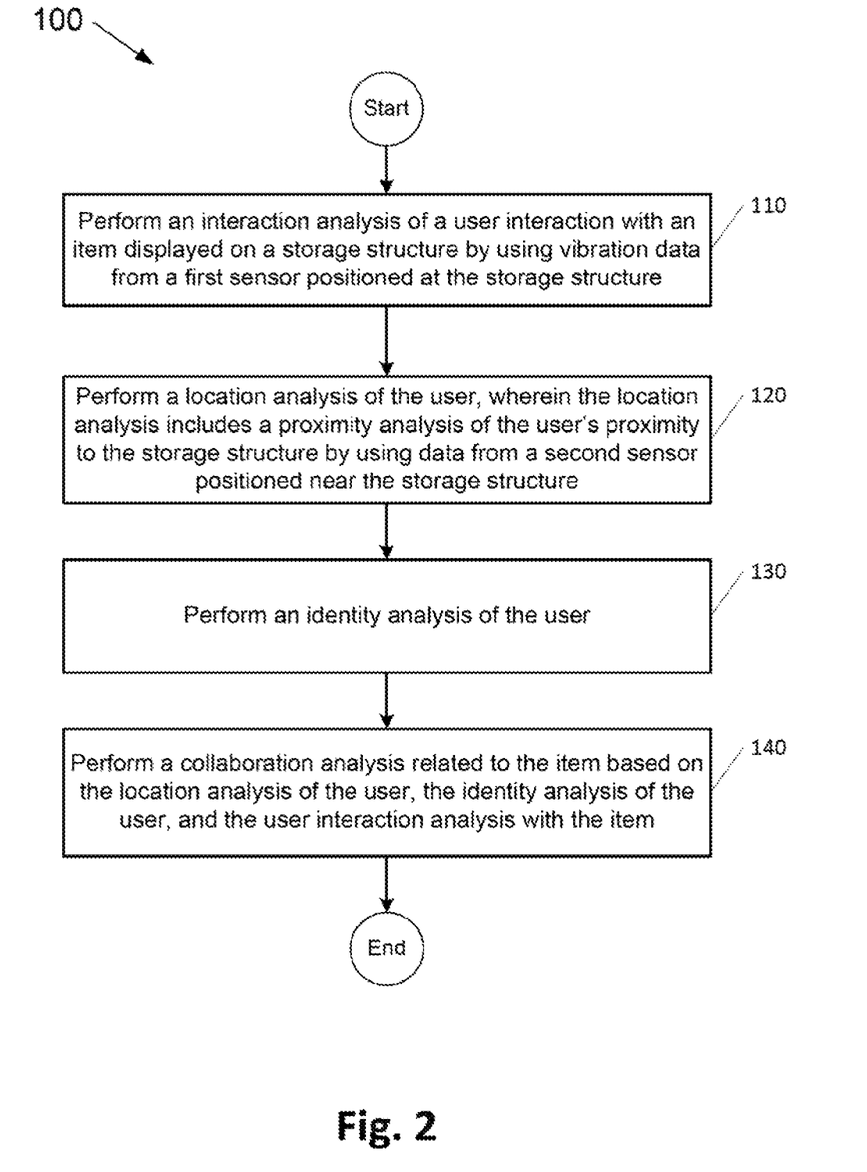
FIG. 2 illustrates a flow chart showing an example of a method for detecting and tracking tangible user interactions with physical items in accordance with an implementation of the present disclosure.

FIG. 2 illustrates a flow chart showing an example of a method 100 for detecting and tracking tangible user interactions with physical items. Although execution of the method 100 is described below with reference to the system 5, the components for executing the method 100 may be spread among multiple devices/systems. The method 100 may be implemented in the form of executable instructions stored on a machine-readable storage medium, and/or in the form of electronic circuitry.

In one example, the method 100 can be executed by at least one processor of a computing device (e.g., device 15). In other examples, the method may be executed by another processor in communication with the system 5. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 begins at 110, where a processor may perform an interaction analysis of a user interaction with an item 11 displayed on a storage structure 14 by using vibration data from a first sensor 10 positioned at the storage structure 14. Thus, the processor may identify a user interaction event for the item 11. As mentioned above, at least one first sensor 10 may be positioned at the storage structure 14 to capture vibration data in proximity to an item displayed on the structure 14. Alternatively, the storage structure 14 may include a plurality of sensors 10 and the system 5 may correlate and analyze vibration data from the different sensors 10 simultaneously. In one example, a processor may receive vibration data as a continuous or periodic stream from the sensor(s) 10 or may retrieve the vibration data by accessing the data from a computer readable medium (not shown) of the sensor(s) 10.

The processor may detect a user interaction with an item 11 on the storage structure 14 by using the vibration data generated from the user interaction with the item. In one implementation, the processor may interact with at least one filter (not shown) and a use a predetermined threshold to process the vibration data and to detect an interaction event with an item. For example, vibration data from the sensor(s)

10 may be extracted in temporal blocks of N seconds. Such vibration data may be generated when a user interacts with (e.g., touches, moves, lifts, etc.) an object on the storage structure 14. That vibration data may then pass through at least one filter (e.g., a zero peak, low pass filter, etc.).

The filtered vibration data may be compared to a pre-identified threshold to determine whether an interaction event has occurred. If the filtered data passes the threshold, the processor may determine that an interaction event with an item on the structure is detected. In addition, the processor may also detect tangible user interactions using combined vibration data from a plurality of sensors 10 positioned in proximity to the item at the storage structure 14. Using data from multiple sensors 10 allows for a detailed analysis of the user interactions (e.g., a specific location/shelf of the storage structure 14 may be identified). Thus, when a user moves or lifts an item from the storage structure 14, the processor may identify that interaction and use it as further described below. In some examples, the processor may communicate with more refined filters to detect on which shelf level (e.g., bottom, middle or top) of the storage structure 14 the tangible interaction with an item is taking place by (e.g., by evaluation the intensity of the received signals). This information combined with item placement information can hale the processor to identify which item the user interacted with.

At 120, the processor may perform a location analysis of the user. In one example, the location analysis may include a proximity analysis of the user's proximity to the storage structure 14 by using data from a second sensor 12 positioned near the storage structure 14. In addition, the location analysis of a user may further include processing location data from a location analysis source (not shown) to detect a location of the user in relation to the storage structure. For example, location data from the different location analysis sources may include data from at least one second sensor 12 (e.g., an accelerometer used as a proximity sensor near the structure 14), data from a camera (e.g., detecting when a user in a field of view), data from various location tracking devices, (active RIFD, BTLE, devices, Wi-Fi devices, passive RFID devices, Quick Response code scans, etc.). The processor may use various techniques to process the received location data to determine the location of the user (e.g., how close the user is to the storage structure 14).

In one implementation, at least one second sensor 12 provides at least a portion of the location data to a processor and the other portion of the location data may be received from other location sources (e.g., cameras, location tracking devices, etc.). The data from the second sensor 12 may be used to perform a proximity analysis of the users proximity to the storage structure 14. In one example, the second sensor 12 may be an accelerometer that can be used as a proximity sensor and may be located near the storage structure 14 (e.g., on designated walkway of a store) to determine users proximity to a storage structure 14 by using generated vibration data. In one example, the level of vibration detected by the sensor 12 (e.g., when a user is walking near the sensor 12) may be proportional to the proximity to the storage structure 14. In one implementation, the collected raw vibration data may pass through at least one filter (e.g., broad-band, zero-peak, etc.) and may them be compared to a first threshold to detect if a user is in the general area of the store (i.e., on the walkway). The filtered data may also be compared to a second threshold to detect if a user is close to the storage structure 14. Thus, the second threshold may be used to perform a proximity analysis of the user's proximity to the storage structure 14. In one example, a second sensor 12 may be placed near all storage structure 14 that are in located in a venue (e.g., a store). In addition, with an increased number of users and activities in the designated environment, dynamic filters may be used to adapt to the increased levels in energy.

With continued reference to FIG. 2, the processor may then perform an identity analysis of the user (at 130). In one implementation, the identity analysis includes processing identity data from an identity source (not shown) to detect an identity of the user (i.e., the user that interacts with an item 11 on the storage structure 14). For example, the processor of the computing device may receive identity data from various identity sources. Such identity sources may include a camera (e.g., when an image of the user is stored in a database that can used to detect the identity of the user), a RIFD/BTLE badge/tag system (e.g., a badge or a mobile device that provides identity data of the user), etc. The processor may then process the received identity information to determine the identity of the user in proximity to or at the storage structure 14.

At 140, the processor may perform a collaboration analysis related to the item 11 based on the location analysis of the user, the identity analysis of the user, and the user interaction analysis with the item. In one example, processing the vibration data from the first sensor 10, the location data from the different location sources, and the identity data from the identity sources is timely synchronized. Thus, the processor may synchronize analyzing the data related to the item 11 (e.g., the vibration data detecting interaction) and to the user (e.g., location data, identity data) to complete a comprehensive and accurate analysis of tangible user interactions with an item. For example, the stream of location data from the second sensor 12 may be reduced at the time an interaction with an item is taking a place (this interaction may be determined based on the analyzed vibration data from the first sensor 10). At that time, location data from other location sources (e.g., cameras, location tracking devices, etc.) may be used by the processor to compete the collaboration analysis. In addition, the stream of location data from the second sensor 12 may increase when a user is moving between different storage structures 14 or the user is preparing for the next interaction with an item. When a processor detects interaction activity at the structure 14 but there is no previous or current activity on the second/floor sensor 12, the processor may determine the received interaction data is erroneous.

Therefore, when performing a collaboration analysis related to an item, a processor may identify a specific item on storage structure 14 that a user is interacting with and the user who is interacting with the item. In one example, the processor may use item placement data to supplement the collaboration analysis. The item placement data may include data regarding the item 11 and its position on the storage structure 14 (e.g., storage unit X displays bags of cat food, etc.). In one implementation, the item placement data may be received from position sensors placed on the items that provide information to the processor. In another implementation, the item placement data may be received from placement information database including data about the location of different items on a storage structure (e.g., inventory database that includes information regarding the exact location of specific item). Thus, a processor may receive various data (e.g., vibration data, location data, identity data, item placement data etc.) from the different sources and may process the data to identify a user that interacted with which specific item on the storage structure 14.

Figure 3:
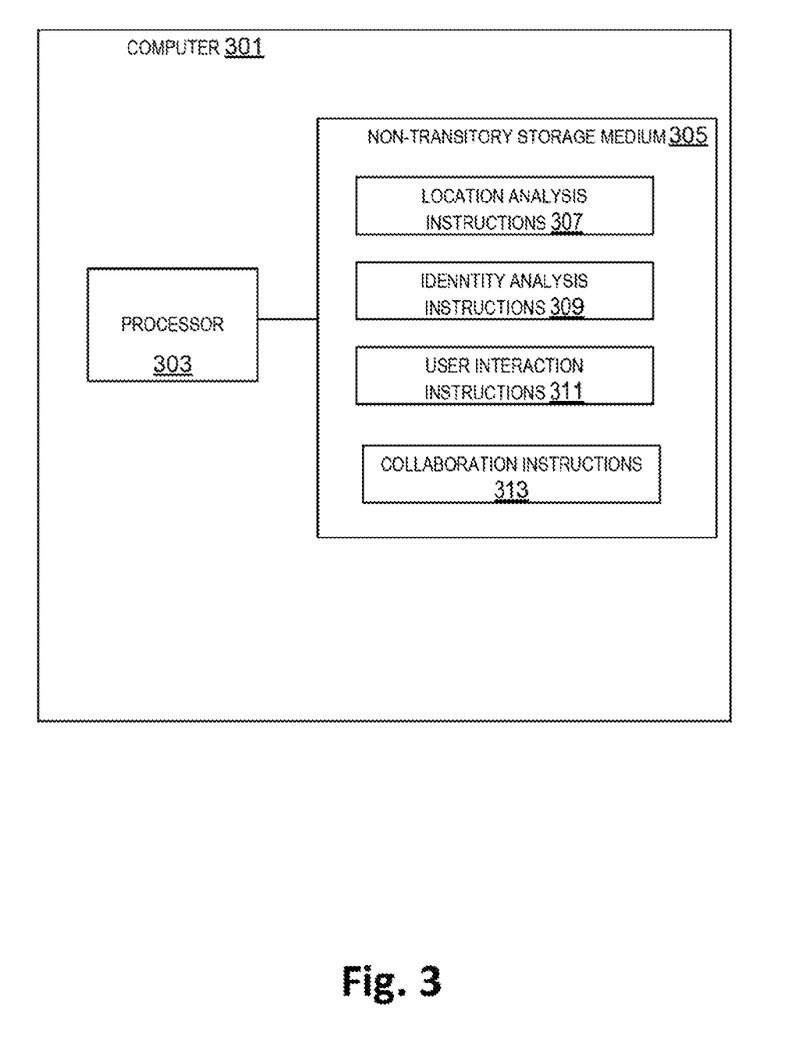
FIG. 3 is an example block diagram illustrating a computer-readable medium in accordance with an implementation of the present disclosure.

FIG. 3 illustrates a computer 301 and a non-transitory machine-readable medium 305 according to an example. In one example, the computer 301 maybe similar to the computing device 15 of the system 5 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.)

Computer 301 may perform method 100 and variations thereof. Additionally, the functionality implemented by computer 301 may be part of a larger software platform, system, application, or the like. Computer 301 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 301 may include a processor 303 and non-transitory machine-readable storage medium 305. The processor 303 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 305 may be operatively coupled to a bus. Processor 303 can include single or multiple cores on a chip, multiple cores across multiple chips, multiple cores across multiple devices, or combinations thereof.

The storage medium 305 may include any suitable type, number, and configuration of volatile or non-transitory machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, compact disc read only memory (CD-ROM), digital video disc read only memory (DVD-ROM), and other suitable magnetic, optical, physical, or electronic memory on which software may be stored.

Software stored on the non-transitory machine-readable storage media 305 and executed by the processor 303 includes, for example, firmware, applications, program data, filters, rules, program modules, and other executable instructions. The processor 303 retrieves from the machine-readable storage media 305 and executes, among other things, instructions related to the control processes and methods described herein.

The processor 303 may fetch, decode, and execute instructions 307-313 among others, to implement various processing. As an alternative or in addition to retrieving and executing instructions, processor 303 may include at least one integrated circuit (IC), other control logic, other electronic circuits, or combinations thereof that include a number of electronic components for performing the functionality of instructions 307-313. Accordingly, processor 303 may be implemented across multiple processing units and instructions 307-313 may be implemented by different processing units in different areas of computer 301.

The instructions 307-313 when executed by processor 303 (e.g., via one processing element or multiple processing elements of the processor) can cause processor 303 to perform processes, for example, method 100, and/or variations and portions thereof. In other examples, the execution of these and other methods may be distributed between the processor 303 and other processors in communication with the processors 303.

For example, location analysis instructions 307 may cause processor 303 to perform location analysis of a user, where the location analysis may include processing location data from a location analysis source to detect a location of the user in relation to a storage structure (e.g., structure 14). These instructions may function similarly to the techniques described in block 120 of method 100. For example, location analysis instructions 307 may cause processor 303 to process the received location data to determine the location of the user (e.g., how close the user is to the storage structure 14). In one example, location analysis instructions may cause processor 303 to performs a proximity analysis of the user user's proximity to the storage structure 14 by using data from a second sensor (e.g., sensor 12) positioned near the storage structure 14.

Identity analysis instructions 309 may cause the processor 303 to perform an identity analysis of the user, where the identity analysis may include processing identity data from an identity source to detect an identity of the user. These instructions may function similarly to the techniques described block 130 of method 100. For example, based on the identified received identity data, the identity analysis instructions 309 may cause the processor 303 to determine the identity of the user in proximity to or at the storage structure 14.

User interaction instructions 311 may cause the processor 303 to perform an interaction analysis of a user interaction with an item (e.g., item 11) displayed on a storage structure (e.g., structure 14) by using vibration data from a first sensor (e.g., sensor 10) positioned at the storage structure to identify a user interaction even with the item 11. These instructions may function similarly to the techniques described block 110 of method 100. For example, the interaction instructions 311 may cause the processor 303 to detect a user interaction with an item 11 on the storage structure 14 by using the vibration data. In one example, instructions 311 may cause the processor to detect tangible user interactions with an item by using combined vibration data from a plurality of sensors 10 positioned in proximity to the item at the storage structure 14.

Collaboration instructions 313 may cause the processor 303 to perform a timely synchronized collaboration analysis related to the item (e.g., item 11) based on the location analysis of the user, the identity analysis of the user, and the user interaction analysis with the item. These instructions 313 may function similarly to the techniques described block 140 of method 100. In one example, the collaboration instructions 313 may cause the processor 303 to identify a specific item on storage structure 14 that a user is interacting with and the user who is interacting with the item. In one implementation, the collaboration instructions 313 may cause the processor 303 to use item placement data to supplement the collaboration analysis. The item placement data may include data regarding the item 11 and its position on the storage structure 14.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A system comprising:
   a first sensor positioned at a storage structure displaying an item, the first sensor to capture vibration data in proximity to the item;
   a second sensor to capture second vibration data;
   a location analysis engine to perform a location analysis of a user based on the second vibration data, wherein the user is detected in a store when the second vibration data exceeds a first threshold and the user is detected at the storage structure when the second vibration exceeds a second threshold;
   an identity analysis engine to perform an identity analysis of the user;
   a user interaction engine to perform a user interaction analysis of the user's interaction with the item based on the vibration data from the first sensor; and
   a collaboration engine to perform a collaboration analysis related to the item based on the location analysis of the user, the identity analysis of the user, and the user interaction analysis, wherein the collaboration analysis is timely synchronized to reduce a stream of the second vibration data from the second sensor when the user's interaction with the item is taking place.

2. The system of claim 1, wherein the location analysis includes processing location data from a location analysis source to detect a location of the user in relation to the storage structure.

3. The system of claim 2, wherein the identity analysis includes processing identity data from an identity source to detect an identity of the user.

4. The system of claim 3, wherein processing the vibration data from the first sensor, the location data, and the identity data is also timely synchronized.

5. The system of claim 2, wherein the collaboration engine is to process item placement information to supplement the collaboration analysis.

6. The system of claim 1, wherein the second sensor provides at least a portion of the location data to the location analysis engine.

7. The system of claim 5, wherein the collaboration analysis may identify a specific item on the storage structure that a user is interacting with.

8. A method comprising, by at least one processor:
   performing a user interaction analysis of a user interaction with an item displayed on a storage structure by using vibration data from a first sensor positioned at the storage structure and second vibration data from a second sensor;
   performing a location analysis of the user, wherein the location analysis includes a proximity analysis of the user's proximity to the storage structure by using the second vibration data from the second sensor positioned near the storage structure, wherein the user is detected in a store when the second vibration data exceeds a first threshold and the user is detected at the storage structure when the second vibration exceeds a second threshold;
   performing an identity analysis of the user; and
   performing a collaboration analysis related to the item based on the location analysis of the user, the identity analysis of the user, and the user interaction analysis, wherein the collaboration analysis is timely synchronized to reduce a stream of the second vibration data from the second sensor when the user interaction with the item is taking place.

9. The method of claim 8, wherein the location analysis further includes processing location data from a location analysis source to detect a location of the user in relation to the storage structure.

10. The system of claim 9, wherein the identity analysis includes processing identity data from an identity source to detect an identity of the user.

11. The system of claim 10, wherein processing the vibration data from the first sensor, the location data, and the identity data is also timely synchronized.

12. A non-transitory machine-readable storage medium encoded with instructions executable by at least one processor, the machine-readable storage medium comprising instructions to:
   perform a user interaction analysis of a user interaction with an item displayed on a storage structure by using vibration data from a first sensor positioned at the storage structure;
   perform a location analysis of the user by using second vibration data from a second sensor positioned near the storage structure, wherein the user is detected in a store when the second vibration data exceeds a first threshold and the user is detected at the storage structure when the second vibration exceeds a second threshold;
   perform an identity analysis of the user; and
   perform a timely synchronized collaboration analysis related to the item based on the location analysis of the user, the identity analysis of the user, and the user interaction analysis, wherein the collaboration analysis is timely synchronized to reduce a stream of the second vibration data from the second sensor when the user interaction with the item is taking place.

13. The non-transitory machine-readable storage medium of claim 12, wherein the identity analysis includes processing identity data from an identity source to detect an identity of the user.

* * * * *